United States Patent [19]

Vogel et al.

[11] Patent Number: 6,151,077
[45] Date of Patent: *Nov. 21, 2000

[54] INTERFACE SYSTEM FOR A TELEVISION RECEIVER

[75] Inventors: Jon Paul Vogel; Jeffrey Reed Lukkarila; Larry D. Johnson, all of Knoxville, Tenn.

[73] Assignee: U.S. Philips Corporation, New York, N.Y.

[*] Notice: This patent is subject to a terminal disclaimer.

[21] Appl. No.: 08/996,666

[22] Filed: Dec. 23, 1997

Related U.S. Application Data

[63] Continuation-in-part of application No. 08/931,061, Sep. 15, 1997, Pat. No. 5,748,255, which is a continuation of application No. 08/777,368, Dec. 27, 1996, abandoned, which is a continuation-in-part of application No. 08/362,037, Dec. 22, 1994, Pat. No. 5,592,234.

[51] Int. Cl.[7] .................................................. H04N 5/44
[52] U.S. Cl. ........................... 348/553; 348/725; 348/552; 348/13
[58] Field of Search ................................. 348/553, 554, 348/563, 564, 552, 468, 725, 734, 565, 13, 12; H04N 5/44, 5/445

[56] References Cited

U.S. PATENT DOCUMENTS

| | | | |
|---|---|---|---|
| 4,161,728 | 7/1979 | Insam . | |
| 4,337,480 | 6/1982 | Bourassin et al. | 358/93 |
| 4,649,428 | 3/1987 | Jones et al. | 358/188 |
| 4,789,860 | 12/1988 | Brennnand et al. | 340/825.51 |
| 5,274,455 | 12/1993 | Nishide et al. | 358/188 |
| 5,283,638 | 2/1994 | Engberg et al. | 348/14 |
| 5,359,367 | 10/1994 | Stockill | 348/552 |
| 5,404,393 | 4/1995 | Remillard | 379/96 |
| 5,621,482 | 4/1997 | Gardner et al. | 348/725 |
| 5,748,255 | 5/1998 | Johnson et al. | 348/553 |

FOREIGN PATENT DOCUMENTS

| | | | |
|---|---|---|---|
| 2620888 | 3/1989 | France | H04N 5/00 |
| 2947793 | 7/1981 | Germany | G06F 1/00 |

*Primary Examiner*—David E. Harvey
*Attorney, Agent, or Firm*—Edward W. Goodman

[57] ABSTRACT

An interface system for a television receiver includes an interface connector having a plurality of contacts connected to various component circuits in the television receiver. In order to provide various functions for the television receiver, the interface system includes various circuit boards each having a plug connectable with the interface connector. The plug includes a number of contacts equal to or less than the plurality of contacts in the interface connector. A particular embodiment of one of the circuit boards includes circuitry for connecting the television receiver to an interconnecting network and for enabling a user to send and receive electronic mail messages using a remote control transmitter for the television receiver.

7 Claims, 6 Drawing Sheets

INTERFACE SYSTEM FOR A TELEVISION RECEIVER

CROSS-REFERENCE TO RELATED APPLICATIONS

This application is a continuation-in-part to U.S. patent application Ser. No. 08/931,061, filed September 15, 1997, now U.S. Pat. No. 5,748,255, which is a continuation of U.S. patent application Ser. No. 08/777,368, filed Dec. 27, 1996, now abandoned, which is a continuation-in-part of U.S. patent application Ser. No. 08/362,037, filed Dec. 22, 1994, now U.S. Pat. No. 5,592,234.

BACKGROUND OF THE INVENTION

1. Field of The Invention

The subject invention relates to television receivers and the various functionality options now available to a user.

2. Description of The Related Art

Television receivers that are being marketed today have various optional functions which may be incorporated therein. For example, the television receiver may include Picture-in-Picture (PIP) in which the video signal for PIP is provided by a second signal source (a VCR) connected to a second video input of the television receiver, or a second tuner so that the television receiver may by itself provide PIP. These and other optional features are provided by modifying the circuitry inside the television receiver. Quite naturally, these changes must be implemented in the production line resulting in a plurality of different models of the television receiver being fabricated. It should be apparent that this results in relatively high production costs. In marketing these separate models of television receivers, a dealer must then anticipate what features his/her customers would desire, and order sufficient quantities of the specific models. Any others must be ordered specifically for that consumer which may result in a lost sale.

In another situation, unless the particular model of television receiver in the user's possession has the appropriate features, the user must open up the television receiver, and cut into existing wiring so that the user may be able to adapt the television receiver for use with, for example, a computer.

One of the current uses for television receivers is as information monitors in a factory or at a convention center, wherein the television receivers are used for viewing special programs broadcast from time to time and for displaying messages for various individuals. Heretofore, it has been necessary to specially modify each television receiver in order to interconnect the television receivers to the network. When it is desired to send a message to an individual, the sending person must contact the information center, usually by telephone, which then composes the message and transmits the message to all of the television receivers. In such a system, it is not possible to address the message to any particular individual, and as such, the message may not be personalized.

SUMMARY OF THE INVENTION

It is an object of the subject invention to provide a standard television receiver which is easily adaptable for use in a network to provide individualized electronic mail message service without the need for personal computers.

The above object is achieved in an interface system for a television receiver, said television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, a display coupled to said deflection circuit and said video signal processing circuit for displaying said video signal in dependence on said deflection signals, and a power supply circuit for supplying operating power to each of the above components, wherein said interface system comprises standard bus means having M leads separately connected to said audio signal processing circuit, said deflection circuit, said video signal processing circuit and said power supply circuit, where M is an integer greater than one; connector means having M contacts connected, respectively, to said M leads in said standard bus means; and circuit board means accessible by a user of said television receiver, said circuit board means having plug means connectable to said connector means, said plug means having N contacts corresponding, respectively, to at least some of the M contacts in said connector means, where N is an integer less than or equal to M, and circuit means connected to said N contacts in said plug means, said circuit means, when connected through said plug means, said connector means and said standard bus means to at least one of the audio signal processing circuit, the video signal processing circuit, the deflection circuit and the power supply circuit in the television receiver, modifies the operation of said television receiver thereby providing additional features for the user, wherein said television receiver further comprises a remote control receiver for receiving remote control signals from a remote control transmitter, and a microcomputer for controlling said television receiver at least partly in response to signals from said remote control receiver, and wherein said standard bus includes leads connected to said remote control receiver and to said microcomputer, characterized in that said circuit means on said circuit board means comprises an interface connector for connecting the circuit board means to interconnecting network; an interface circuit coupled to said interface connector for applying outgoing message signals to and for receiving incoming message signals from said interconnecting network; means, coupled to said interface circuit, for applying a recipient identifying key to the outgoing message signals and for detecting a receiving identifying key in the incoming message signals; and a further microprocessor coupled to said interface circuit for supplying said outgoing message signals and for processing said incoming message signals, said further microprocessor having a first memory coupled thereto for storing an operating program, and a second memory coupled thereto for temporarily storing data signals, wherein said further microprocessor is coupled to said microprocessor and said remote control receiver via said plug means and said connector means, and wherein said remote control transmitter is arranged to transmit an ID code, and to transmit a message coupled to an ID code of a recipient, whereby depending on remote control signals received by said remote control receiver, said further microprocessor sends message signals with said recipient ID code through said identifying means and said interface circuit to said interconnecting network, and whereby said identifying means retrieves from the interconnecting network message signals having recipient ID codes coupled thereto, said further microprocessor storing said message signals coupled with said recipient ID codes in said second memory, and, depending on the ID code sent by said remote control transmitter, said further microprocessor causes the message signal coupled to said ID code to be displayed.

As shown in FIG. 1, the interface system of the subject invention allows a television receiver to be modified and/or upgraded to various different functionalities including, for example, CD-Video, CD-I, ghost cancellation, dual picture television, digital compressed video, and, in the present case, network interconnectivity.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
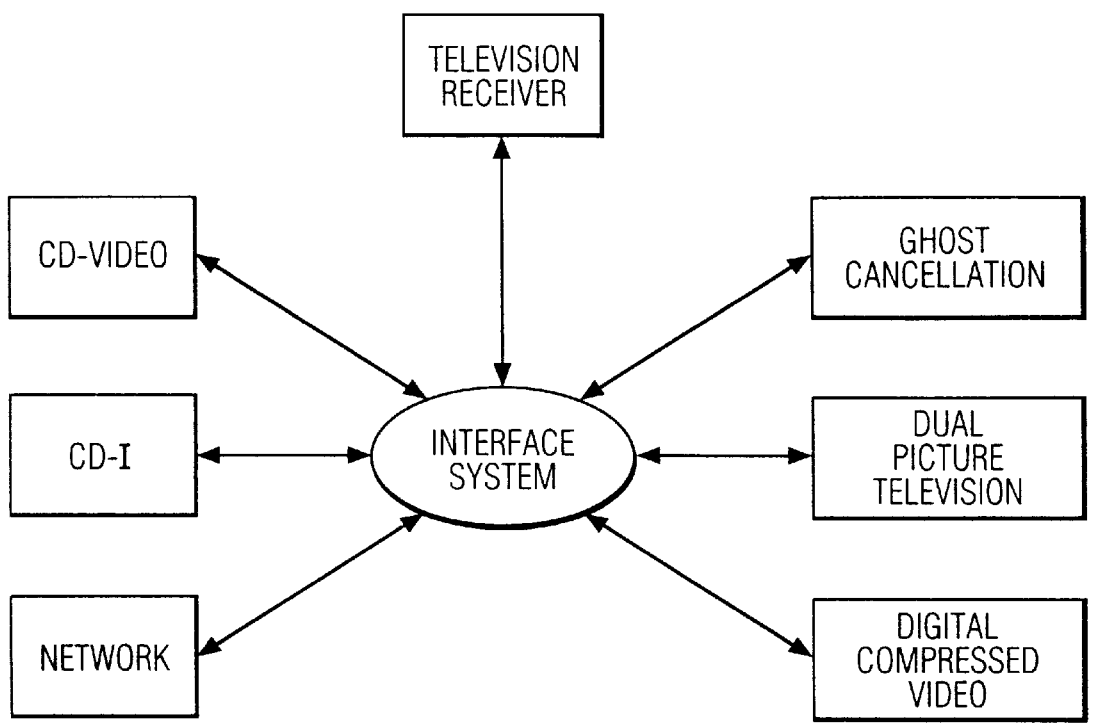
FIG. 1 shows various different applications for the interface system of the subject invention.
Figure 2:
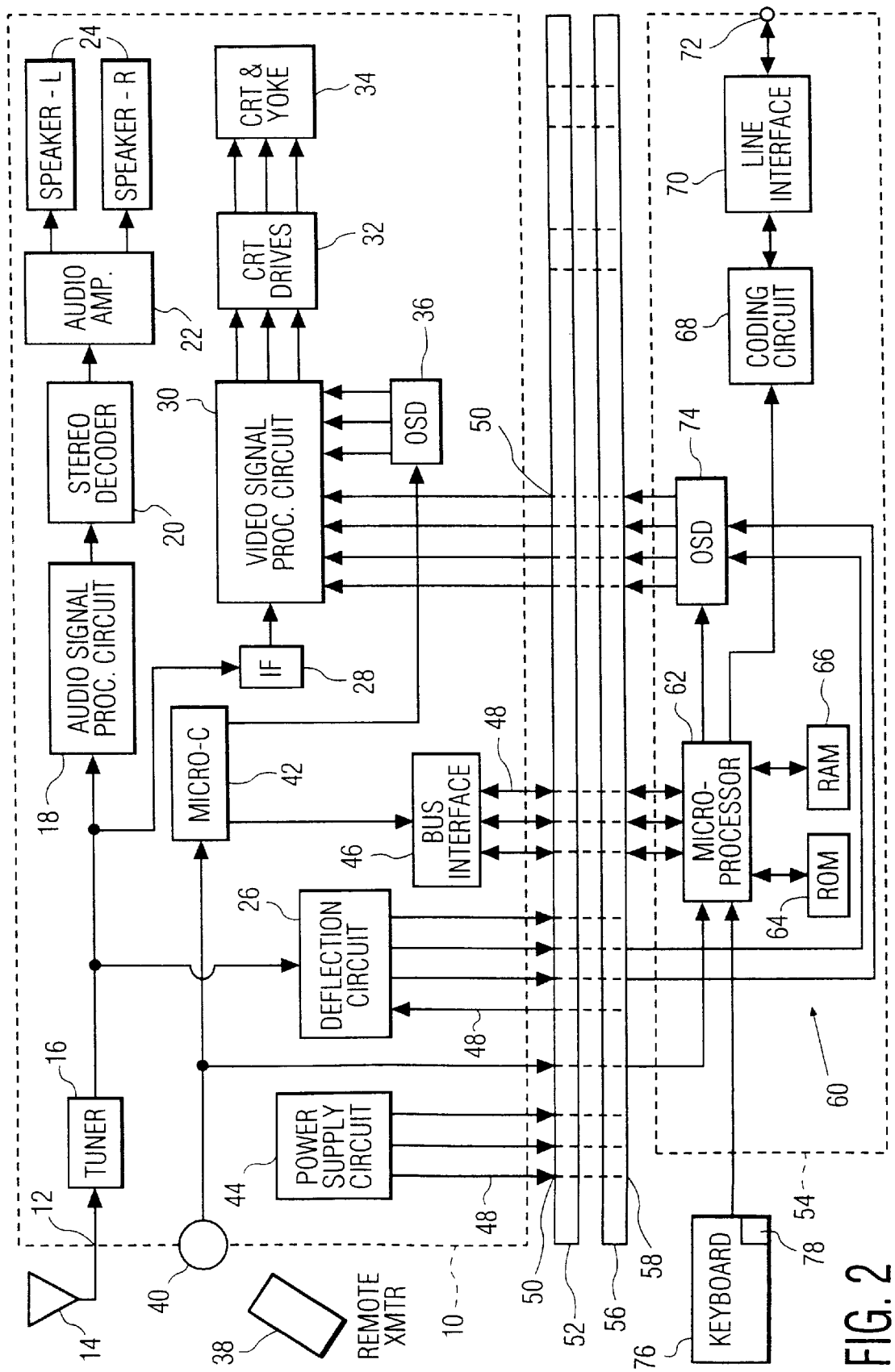
FIG. 2 shows, in block diagram form, a standard television receiver in which the interface system is used to provide individualized electronic mail in an interconnecting.

FIG. 2 shows a standard television receiver 10 having an input 12 for receiving television signals from, for example, an antenna 14. The input 12 is connected to a tuner 16 for tuning the television receiver 10 to a particular television signal. The output from the tuner 16 is connected to an audio signal processing circuit 18 which separates an audio signal from the received television signal. An output from the audio signal processing circuit 18 is connected to a stereo decoder 20 which decodes the audio signal into separate left and right audio signals. A stereo audio amplifier 22 is shown which amplifies left and right audio signals for application to a left and a right speaker 24. The output from the tuner 16 is also applied to a deflection circuit 26 for generating deflection signals from synchronization signals contained in the television signal, and to an intermediate frequency stage (IF) 28 which converts the received television signal to a baseband CVBS signal. A video signal processing circuit 30 is provided for processing a baseband CVBS signal into component color signals (RGB) for application to cathode ray tube (crt) driver circuits 32 for driving a crt 34, which also receives the deflection signals from the deflection circuit 26. The video signal processing circuit 30 has an on-screen display circuit 36 connected thereto for providing video signals indicating messages for display on the crt 34. As noted in FIG. 2, an infrared remote control transmitter 38 is shown for interaction with a remote control receiver 40 in the television receiver 10. A microcomputer 42 is also shown connected to the remote control receiver 40 and controls the operation of the other elements in the television receiver 10, and in particular, the on-screen display circuit 36, in part, based on signals received by the remote control receiver 40. Finally, a power supply circuit 44 is shown which provides operating power to each of the above circuits. It should be noted that the connecting lines between these components have been omitted for clarity, any one skilled in the art would know how each of these circuits would be connected to the power supply circuit 44.

The subject invention includes the provision of a bus interface 46 in the television receiver 10 which is connected to the microcomputer 42, and a standard bus having lines 48 connected to each of the above-noted components, and in particular, the power supply circuit 44, the remote control receiver 40, the deflection circuit 26, the bus interface 46, the video signal processing circuit 30, the IF 28, the stereo decoder 20 and the stereo audio amplifier 22. These lines 48 are then connected to contacts 50 in an interface connector 52. A circuit board 54 is then provided with a plug 56 having contacts 58 for engaging with the contacts 50 in the interface connector 52. In particular, depending on the functionalities to be offered by the particular circuit board 54, various ones of the contacts 58 in the plug 56 are connected to circuits 60 mounted on the circuit board 54.

Figure 6:
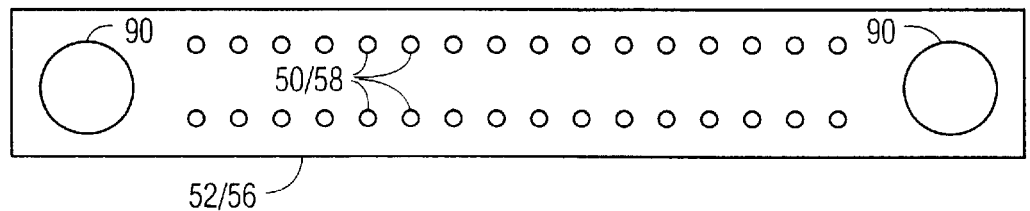
FIG. 6 shows an interface connector for use in the interface system.

FIG. 6 shows an example of the interface connector 52 (or plug 56) and shows contacts 50 (58) and holes 90 by which the connector 52 and the plug 56 may be fastened together.

As shown in FIG. 2, the circuits 60 include a microprocessor 62 connected to the microcomputer 42 through the contacts 58 in the plug 56 and the contacts 50 in the connector 52 and the bus interface 46. The microprocessor 62 is further connected to the remote control receiver 40. A read-only memory 64 is connected to the microprocessor 62 and has stored therein operating instructions for the microprocessor 62. A random access memory (RAM) 66 is also connected to the microprocessor 62 for temporarily storing data. The microprocessor 62 is connected to a coding circuit 68 for processing outgoing and incoming signals, which is, in turn, connected to a line interface circuit 70 for interfacing with an interconnecting network through connector 72.

The microprocessor 62 sends message signals to an on-screen display (OSD) 74 which receives horizontal synchronizing signals from the deflection circuit 26 and applies video signals corresponding to the message to the video signal processing circuit 30 for display on the crt 34.

In one embodiment of the invention, a keyboard 76 having a plurality of alpha-numeric keys is shown coupled to the microprocessor 62. When it is desired to display a message on the television receiver 10 to which the circuit board 54 is attached, the user merely types the message on the keyboard and, as the message is being typed, the microprocessor 62 instructs the OSD 74 to apply corresponding video signals to the video signal processing circuit 30 and instructs the microcomputer 42 to cause the video signal processing circuit 30 to apply the video signals from the OSD 74 to the Crt 34 thereby displaying the message on the television receiver 10. If the user desires this message to be sent to other television receivers connected to the interconnecting network, the user then presses a transmit key 78 on the keyboard 76. The microprocessor 62 then sends the message to the coding circuit 68 which encodes the message and applies the coded message to the line interface circuit 70 which applies the same to the interconnecting network via the interface connector 72. In another television receiver connected to the interconnecting network, the line interface circuit 70 transfers the message to the coding circuit 68 which decodes the message and sends the decoded message to the microprocessor 62. The microprocessor 62 then applies signals to the OSD 74 to generate corresponding video signals which are applied to the video signal processing circuit 30. The microprocessor 62 also instructs the microcomputer 42 to cause the video signal processing circuit 30 to apply the video signals from the OSD 74 to the crt 34 thereby displaying the transmitted message.

In another embodiment of the invention, the messages may be personalized and targeted for a particular individual.

Figures 3, 4:
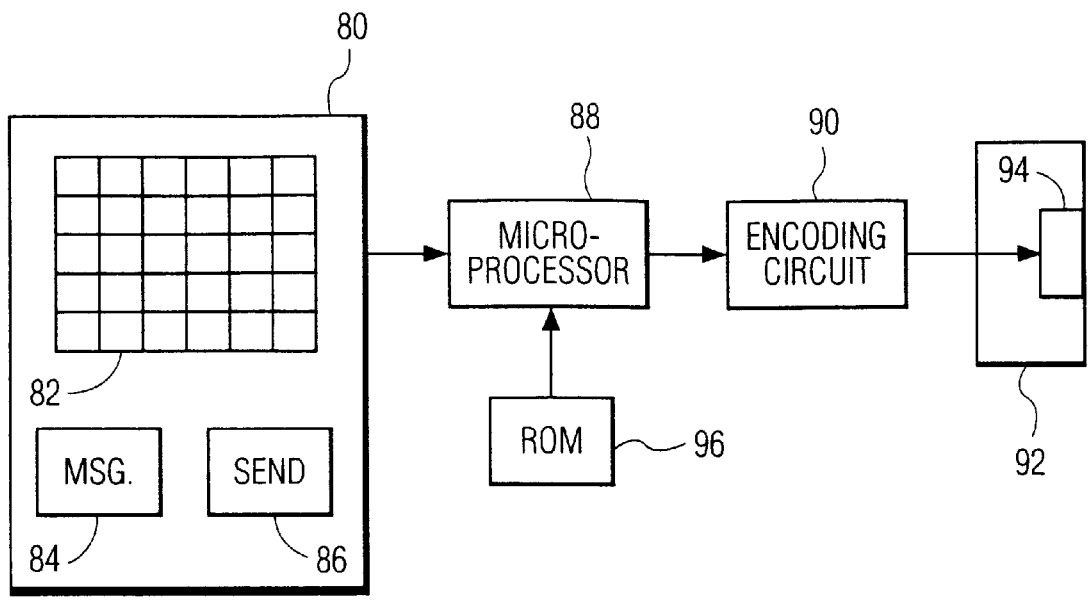
FIG. 3 shows, in block diagram form, a remote control transmitter for use with the subject invention.
FIG. 4 shows a sample template for a new message as displayed on the television receiver.

In this embodiment, the separate keyboard 76 is obviated. In particular, FIG. 3 shows a block diagram of the remote control transmitter 38. As shown therein, the remote control transmitter 38 includes a keyboard 80 having various operating keys 82 including alpha-numeric keys, a "MESSAGE" key 84 for sending the ID code of the remote control transmitter and for composing a new message, and a "SEND" key 86 for sending the composed message. The keyboard 80 is connected to a microprocessor 88 for processing the signals from the keyboard. An output from the microprocessor 88 is applied to an encoding circuit 90 which drives a transmitting circuit 92 which includes an infrared light emitting diode 94. A read-only memory (ROM) 96 is connected to the microprocessor 88 and contains operating instructions for the microprocessor 88. In addition, the ROM 96 also contains the ID code for the remote control transmitter which the microprocessor 88 applies to the encoding circuit 90 when the "MESSAGE" key 84 is pressed.

In operation, all users of the system are issued their own remote control transmitter, each of which having its own unique ID code. When a user at one television receiver desires to send a message to another user, the user presses the "MESSAGE" key 84 on his/her remote control transmitter 38 which instructs the microprocessor 62 that the user desires to send a message. The microprocessor 62 responds by sending a message template to OSD 74 which applies a corresponding signal to the video signal processing circuit 30. The microprocessor 62 then instructs the microcomputer 42 to cause the video signal processing circuit 30 to display the message template on the crt 34. FIG. 4 show a sample illustration of the message template. Using the alpha-numeric keys 82, the user enters the ID code of the recipient of the message and composes the message while it is being displayed on the crt 34 of the television receiver 10. When completed, the user transmits the message by pressing the "SEND" key 86 on the remote control transmitter 38. The microprocessor 62 then transfers the message signal with the ID code of the recipient to the coding circuit 68 which encodes the message signal and applies the encoded message signal to the interconnecting network through the line interface circuit 70 and the connector 72. The microprocessor 62 also stores the message signal with the ID code in RAM 66.

Other television receivers connected to the interconnecting network then receive the message signal with the ID code through the connector 72 and the line interface circuit 70. The coding circuit 68 detects and decodes the message signal with the ID code and sends it to the microprocessor 62 which stores the same in RAM 66. When the another user desires to retrieve any messages sent to him/her, that user presses the "MESSAGE" key 84 on his/her remote control transmitter 38 which sends its ID code to the microprocessor 62. If this ID code matches the ID code coupled to a message signal stored in RAM 66, the microprocessor 62 sends the message signal to the OSD 74 which applies a video signal containing the message to the video signal processing circuit 30. At the same time, the microprocessor 62 instructs the microcomputer 42 to cause the video signal processing circuit 30 to apply the video signal from the OSD 74 to the crt 34. Subsequent presses of the "MESSAGE" key 84 cause other messages to be displayed. If there are no other messages, a subsequent pressing of the "MESSAGE" key 84 will cause the microprocessor 62 to assume that that user wishes to send a new message, and will proceed as indicated above.

Figure 5A:
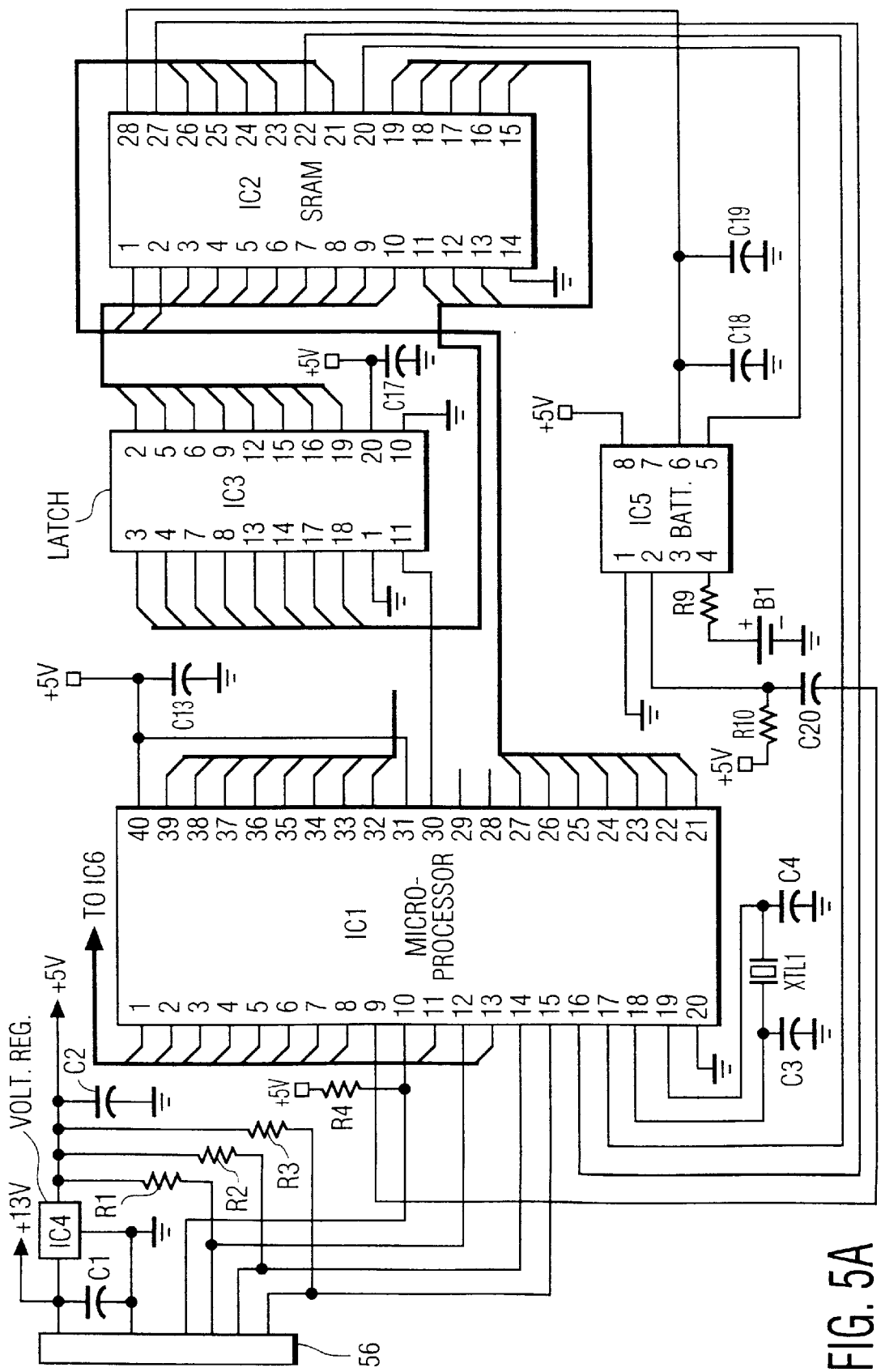
FIG. 5 shows a schematic block diagram of a practical embodiment of the subject invention.
Figure 5B:
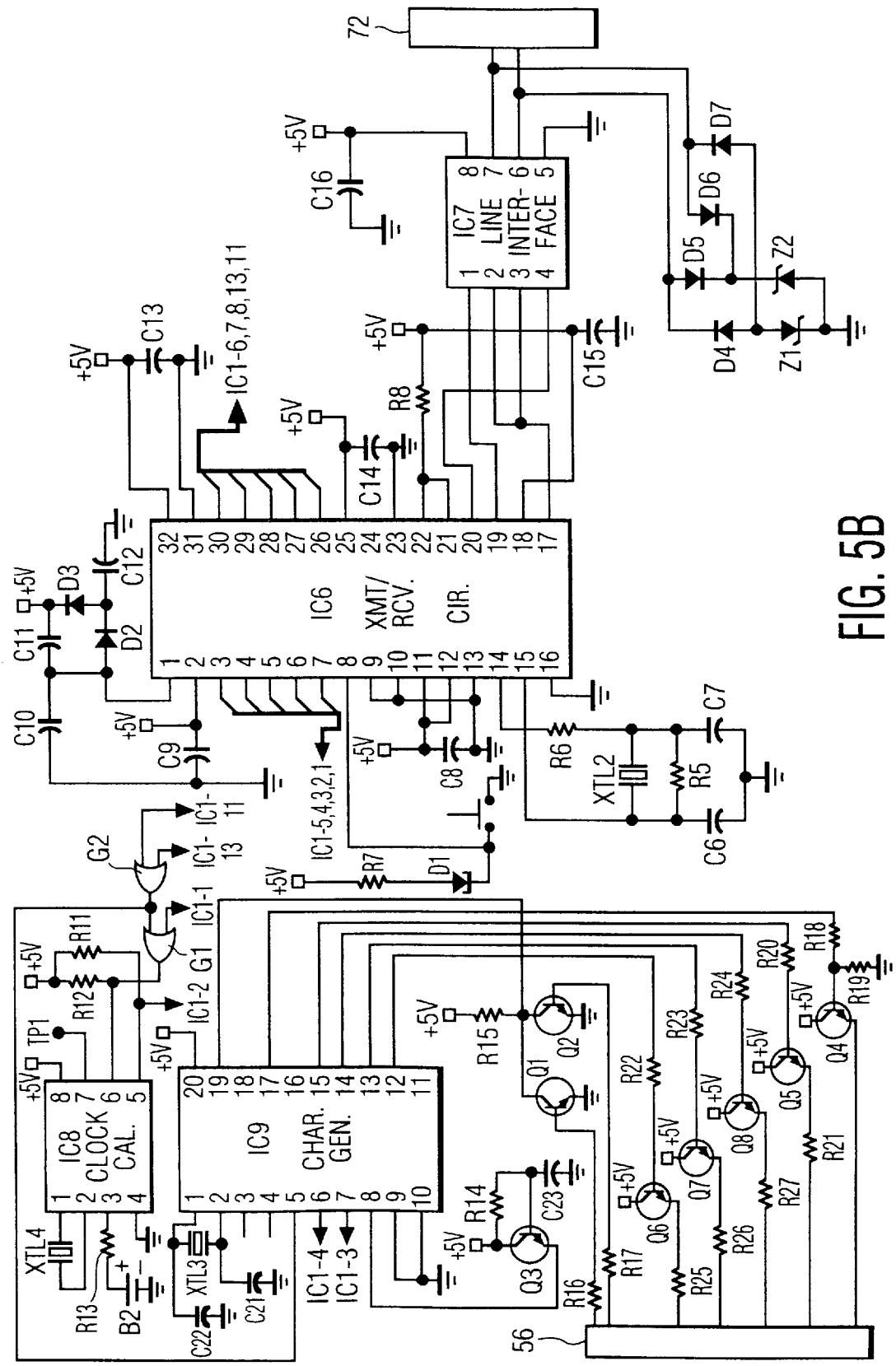

FIGS. 5A and 5B show, in block diagram form, a practical embodiment of the circuit board 54 of the subject invention.

In particular, as shown in FIG. 5A, a microprocessor IC1 is connected to plug 56 and interacts with the microcomputer 42 in the television receiver 10 through the bus interface 46 via pins 12, 14 and 15, while pin 10 is connected through plug 56 to receive the output signals from the remote control receiver 40 in the television receiver 10. The microprocessor 62 includes pins having the functions as shown in Table 1:

TABLE 1

| PIN NO. | FUNCT. |
|---|---|
| 1 | P1.0 |
| 2 | P1.1 |
| 3 | P1.2 |
| 4 | P1.3 |
| 5 | P1.4 |
| 6 | P1.5 |
| 7 | P1.6 |
| 8 | P1.7 |
| 9 | RST |
| 10 | P3.0 |
| 11 | P3.1 |
| 12 | P3.2 |
| 13 | P3.3 |
| 14 | P3.4 |
| 15 | P3.5 |
| 16 | P3.6 |
| 17 | P3.7 |
| 18 | XTAL2 |
| 19 | XTAL1 |
| 20 | VSS |
| 21 | P2.0 |
| 22 | P2.1 |
| 23 | P2.2 |
| 24 | P2.3 |
| 25 | P2.4 |
| 26 | P2.5 |
| 27 | P2.6 |
| 28 | P2.7 |
| 29 | PSEN |
| 30 | ALE |
| 31 | EA |
| 32 | AD7 |
| 33 | AD6 |
| 34 | AD5 |
| 35 | AD4 |
| 36 | AD3 |
| 37 | AD2 |
| 38 | AD1 |
| 39 | AD0 |
| 40 | VDD |

Instead of ROM 64 and RAM 66, this embodiment includes an SRAM IC2 which is coupled to the microprocessor IC1 both directly and through octal latch IC3. To provide operating power, the present embodiment includes a voltage regulator IC4 which is connected to the power supply circuit 44 in the television receiver 10 through the plug 56. In order to maintain data contained in the SRAM IC2 when the television receiver 10 is OFF or when the circuit board 54 is not connected to the television receiver 10, a battery back-up circuit IC5 is included and provides both operating and stand-by power to the SRAM IC2 under control of the microprocessor IC1 via pin 9.

Pins 1–8, 13 and 11 of microprocessor IC1 are shown as interacting with pins 7-3 and 26–30, respectively, of a coding circuit IC6 (see FIG. 5B). The coding circuit IC6 includes pins having functions as shown in Table 2:

TABLE 2

| PIN NO. | FUNCT. |
|---|---|
| 1 | RESET |
| 2 | VDO |
| 3 | I04 |
| 4 | I03 |
| 5 | I02 |
| 6 | I01 |
| 7 | I00 |
| 8 | N-SERV. |
| 9 | VSS |
| 10 | VSS |
| 11 | VDO |
| 12 | VDO |
| 13 | VSS |
| 14 | CLK2 |
| 15 | CLK1 |
| 16 | VSS |
| 17 | CP2 |
| 18 | VDD |
| 19 | CP0 |
| 20 | CP1 |
| 21 | CP3 |
| 22 | CP4 |
| 23 | VSS |
| 24 | I010 |
| 25 | VDD |
| 26 | I09 |
| 27 | I08 |
| 28 | I07 |
| 29 | I06 |
| 30 | I05 |
| 31 | VSS |
| 32 | VDO |

Pins 17, 19 and 20 of the coding circuit IC6 are connected to a line interface circuit IC7 which, in turn, is connected to the connector 72 interfacing with the interconnecting network.

The circuits 60 further include a clock/calendar circuit IC8 which receives signals from pins 1 and 11/13 of microprocessor IC1 via OR-gates G1 and G2, and applies its output signal to pin 2 of microprocessor IC1. Finally, a character generator IC9 is included and receives data signals from pins 3 and 4 of microprocessor IC1, and is further connected to the output from OR-gate G2. The character generator IC9 is connected to receive horizontal and vertical synchronizing signals from the deflection circuit 26 via the plug 26 and transistors Q1 and Q2. The character generator IC9 is arranged to provide both analog R, G, B signals to the video signal processing circuit 30 via transistors Q6, Q7 and Q8, as well as a composite video signal and a blanking signal via transistors Q4 and Q5, the outputs from each of these transistors being connected to the plug 56. Depending on the television receiver 10 being used with the circuit board 54, either the R, G, B signals, or the composite video signal may be directed to the video signal processing circuit.

In this embodiment, the various components have the following values:

| RESISTORS | |
|---|---|
| R1, R2, R3, R4, R25, R26, R27 | 4.7 KΩ |
| R5, R13 | 100 KΩ |
| R6, R7 | 270 Ω |
| R8, R10, R11, R12, R14, R15, R16, R17 R20, R22, R23, R24 | 10 KΩ |
| R9, R19 | 1.0 KΩ |
| R18 | 3.9 KΩ |
| R21 | 820 Ω |

| CAPACITORS | |
|---|---|
| C1, C23 | 10 μF |
| C2, C20 | 1.0 μF |
| C3, C4 | 27 pF |
| C5, C8, C9, C13, C15, C16, C17 C21, C22 | 0.01 μF |
| C6, C7 | 27 μF |
| C10, C11 | 68 μF |
| C12 | 2.2 μF |
| C14 | 100 μF |
| C18 | 0.1 μF |
| C19 | 47 μF |

| CRYSTALS | |
|---|---|
| XTL1 | 16.820 MHz |
| XTL2 | 10 MHz |
| XTL3 | 8 MHz |
| XTL4 | 32.768 kHz |

| INTEGRATED CIRCUITS | | |
|---|---|---|
| IC1 | P87C58EFP-N | Microprocessor |
| IC2 | KM68257CJ-15 | 32 Kb Static Ram |
| IC3 | 74HC373 | Octal Latch |
| IC4 | 7805 | Voltage Regulator |
| IC5 | BA6129AF | Battery Backup Switch |
| IC6 | MC143120 | Neuron |
| IC7 | MC75176BP | RS485 Interface |
| IC8 | CMK41T56N | Clock/Calendar |
| IC9 | STV9410 | Character Generator |

Numerous alterations and modifications of the structure herein disclosed will present themselves to those skilled in the art. However, it is to be understood that the above described embodiments are for purposes of illustration only and not to be construed as a limitation of the invention. All such modifications which do not depart from the spirit of the invention are intended to be included within the scope of the appended claims.

What is claimed is:

1. An interface system for a television receiver, said television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, a display coupled to said deflection circuit and said video signal processing circuit for displaying said video signal in dependence on said deflection signals, and a power supply circuit for supplying operating power to each of the above components, wherein said interface system comprises:

standard bus means having M leads separately connected to said audio signal processing circuit, said deflection circuit, said video signal processing circuit and said power supply circuit, where M is an integer greater than one;

connector means having M contacts connected, respectively, to said M leads in said standard bus means; and circuit board means accessible by a user of said television receiver, said circuit board means having plug means connectable to said connector means, said plug means having N contacts corresponding, respectively, to at least some of the M contacts in said connector means, where N is an integer less than or equal to M, and circuit means connected to said N contacts in said plug means, said circuit means, when connected through said plug means, said connector means and said standard bus means to at least one of the audio signal processing circuit, the video signal processing circuit, the deflection circuit and the power supply circuit in the television receiver, modifies the operation of said television receiver thereby providing additional features for the user, wherein said television receiver further comprises a microcomputer for controlling said television receiver, and wherein said standard bus means includes leads connected to said microcomputer, characterized in that said circuit means on said circuit board means comprises:

an interface connector for connecting the circuit board means to an interconnecting network;

an interface circuit coupled to said interface connector for applying outgoing message signals to and for receiving incoming message signals from said interconnecting network;

coding means, coupled to said interface circuit, for encoding the outgoing message signals and for detecting and decoding incoming message signals;

a keyboard having a plurality of alpha-numeric keys for generating messages;

a microprocessor coupled to said keyboard and said coding means for generating said outgoing message signals from the messages from said keyboard, and for processing said incoming message signals, said microprocessor having a first memory coupled thereto for storing an operating program, and a second memory coupled thereto for temporarily storing data signals, wherein said microprocessor is coupled to said microcomputer via said plug means and said connector means, whereby depending on the messages from said keyboard, said microprocessor sends the message signals through said coding means and said interface circuit to said interconnecting network, and whereby said coding means detects and decodes message signals from the interconnecting network, and said microprocessor causes the message signals to be displayed.

2. An interface system for a television receiver, said television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, a display coupled to said deflection circuit and said video signal processing circuit for displaying said video signal in dependence on said deflection signals, and a power supply circuit for supplying operating power to each of the above components, wherein said interface system comprises:

standard bus means having M leads separately connected to said audio signal processing circuit, said deflection circuit, said video signal processing circuit and said power supply circuit, where M is an integer greater than one;

connector means having M contacts connected, respectively, to said M leads in said standard bus means; and circuit board means accessible by a user of said television receiver, said circuit board means having plug means connectable to said connector means, said plug means having N contacts corresponding, respectively, to at least some of the M contacts in said connector means, where N is an integer less than or equal to M, and circuit means connected to said N contacts in said plug means, said circuit means, when connected through said plug means, said connector means and said standard bus means to at least one of the audio signal processing circuit, the video signal processing circuit, the deflection circuit and the power supply circuit in the television receiver, modifies the operation of said television receiver thereby providing additional features for the user, wherein said television receiver further comprises a remote control receiver for receiving remote control signals from a remote control transmitter, and a microcomputer for controlling said television receiver at least partly in response to signals from said remote control receiver, and wherein said standard bus means includes leads connected to said remote control receiver and to said microcomputer, characterized in that said circuit means on said circuit board means comprises:

an interface connector for connecting the circuit board means to an interconnecting network;

an interface circuit coupled to said interface connector for applying outgoing message signals to and for receiving incoming message signals from said interconnecting network;

coding means, coupled to said interface circuit, for encoding the outgoing message signals and for detecting and decoding incoming message signals; and a microprocessor coupled to said coding means for supplying said outgoing message signals and for processing said incoming message signals, said microprocessor having a first memory coupled thereto for storing an operating program, and a second memory coupled thereto for temporarily storing data signals, wherein said microprocessor is coupled to said microcomputer and said remote control receiver via said plug means and said connector means, and wherein said remote control transmitter is arranged to transmit an ID code associated with the particular remote control transmitter, and to transmit a message coupled to an ID code of an intended recipient, whereby depending on remote control signals received by said remote control receiver, said microprocessor sends message signals with said recipient ID code through said coding means and said interface circuit to said interconnecting network, and whereby said coding means detects and decodes message signals having recipient ID codes coupled thereto from the interconnecting network, said microprocessor storing said message signals coupled with said recipient ID codes in said second memory, and, depending on the ID code sent by said remote control transmitter, said microprocessor causes the message signal coupled to said ID code to be displayed.

3. An interface system as claimed in claim 2, wherein said circuit board means further comprises on-screen display means coupled to said microprocessor for generating alpha-numeric characters for display in response to said message signals.

4. An interface system as claimed in claim 2, wherein said remote control transmitter comprises a keyboard having a plurality of alpha-numeric keys, a message key and a send key; a further microprocessor for scanning said keys and for forming signals depending on which of said keys have been depressed; a memory coupled to said further microprocessor, said memory having stored therein said ID code; an encoding circuit coupled to an output of said further microprocessor for encoding said signals; and transmitting means for transmitting said encoded signals.

5. An interface system as claimed in claim 4, wherein when said message key is depressed, said further microprocessor sends a signal including said ID code.

6. Circuit board means for use in a television interface system including a television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, a display coupled to said deflection circuit and said video signal processing circuit for displaying said video signal in dependence on said deflection signals, and a power supply circuit for supplying operating power to each of the above components, said interface system comprising:

standard bus means having M leads separately connected to said audio signal processing circuit, said deflection circuit, said video signal processing circuit and said power supply circuit, where M is an integer greater than one; and connector means having M contacts connected, respectively, to said M leads in said standard bus means, wherein said circuit board means includes:

plug means connectable to said connector means, said plug means having N contacts corresponding, respectively, to at least some of the M contacts in said connector means, where N is an integer less than or equal to M; and circuit means connected to said N contacts in said plug means, said circuit means, when connected through said plug means, said connector means and said standard bus means to at least one of the audio signal processing circuit, the video signal processing circuit, the deflection circuit and the power supply circuit in the television receiver, modifies the operation of said television receiver thereby providing additional features for the user, wherein said television receiver further comprises a remote control receiver for receiving remote control signals from a remote control transmitter, and a microcomputer for controlling said television receiver at least partly in response to signals from said remote control receiver, and wherein said standard bus means includes leads connected to said remote control receiver and to said microcomputer, characterized in that said circuit means on said circuit board means comprises:

an interface connector for connecting the circuit board means to an interconnecting network;

an interface circuit coupled to said interface connector for applying outgoing message signals to said interconnecting network, and for receiving incoming message signals from said interconnecting network;

coding means, coupled to said interface circuit, for encoding said outgoing message signals and for detecting and decoding said incoming message signals; and a microprocessor coupled to said coding means for supplying said outgoing message signals and for processing said incoming message signals, said microprocessor having a first memory coupled thereto for storing an operating program, and a second memory coupled thereto for temporarily storing data signals, wherein said microprocessor is coupleable to said microcomputer and said remote control receiver via said plug means and said connector means, and wherein said remote control transmitter is arranged to transmit a unique ID code associated with said remote control transmitter, and to transmit a message coupled to an ID code of an intended recipient, whereby depending on remote control signals received by said remote control receiver, said microprocessor sends message signals coupled with said recipient ID code through said coding means and said interface circuit to said interconnecting network, and whereby said coding means detects and decodes message signals having recipient ID codes coupled thereto from the interconnecting network, said microprocessor storing said message signals coupled with said recipient ID codes in said second memory, and, depending on the ID code sent by said remote control transmitter, said microprocessor causes the message signal coupled to said ID code to be displayed.

7. Circuit board means as claimed in claim 6, wherein said circuit board means further comprises on-screen display means coupled to said microprocessor for generating alpha-numeric characters for display in response to said message signals.

\* \* \* \* \*